United States Patent
Choi et al.

(10) Patent No.: US 8,875,108 B2
(45) Date of Patent: Oct. 28, 2014

(54) RUN-TIME BOTTLENECK DETECTION

(75) Inventors: Yoonseo Choi, Yorktown Heights, NY (US); Cheng-Hong Li, Princeton, NJ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/349,357

(22) Filed: Jan. 12, 2012

(65) Prior Publication Data

US 2013/0185702 A1 Jul. 18, 2013

(51) Int. Cl.
*G06F 9/44* (2006.01)
*G06F 15/16* (2006.01)
*G06F 15/173* (2006.01)

(52) U.S. Cl.
USPC .................. 717/130; 709/203; 709/224

(58) Field of Classification Search
CPC ............ G06F 11/3466; G06F 11/3409; G06F 11/3419; G06F 11/3476; G06F 11/3664
See application file for complete search history.

(56) References Cited

U.S. PATENT DOCUMENTS

| | | | | |
|---|---|---|---|---|
| 5,790,691 A * | 8/1998 | Narayanswamy et al. | ... | 382/133 |
| 7,143,396 B2 * | 11/2006 | Suresh | ......... | 717/130 |
| 7,197,629 B2 * | 3/2007 | Paulraj | ......... | 712/227 |
| 7,568,028 B2 * | 7/2009 | Horikawa | ......... | 709/224 |
| 7,877,435 B2 * | 1/2011 | Allan | ......... | 709/201 |
| 2009/0300183 A1 | 12/2009 | Feng et al. | | |
| 2012/0123739 A1 * | 5/2012 | Sethumadhavan et al. | ... | 702/186 |
| 2012/0131235 A1 * | 5/2012 | Nageshappa et al. | ........ | 710/22 |

OTHER PUBLICATIONS

Julian Elischer, netgraph—graph based kernel networking subsystem, BSD Kernel Interfaces Manual, May 25, 2008.*
Battré, D. et al., Detecting Bottlenecks in Parallel DAG-based Data Flow Programs, Many-Task Computing on Grids and Supercomputers (MTAGS), 2010 IEEE, Date: Nov. 15, 2010.
Gueyoung Jung et al., Detecting Bottleneck in n-Tier IT Applications Through Analysis, In IFIP/IEEE Distributed Systems: Operations and Management, Oct. 23-25, 2006, pp. 149-160.

* cited by examiner

*Primary Examiner* — Don Wong
*Assistant Examiner* — Mohammed Kabir
(74) *Attorney, Agent, or Firm* — F. Chau & Associates, LLC

(57) ABSTRACT

A method of detecting a bottleneck in a data flow program includes executing the data flow program, wherein the data flow program comprises a kernel, determining a percentage of time the kernel spends on a computation, and determining the kernel to be a bottleneck upon comparing the percentage of time the kernel spends on the computation to a condition.

21 Claims, 7 Drawing Sheets

RUN-TIME BOTTLENECK DETECTION

BACKGROUND

1. Technical Field

The present application relates to bottleneck detection, and more particularly to the detection of a bottleneck at run-time.

2. Discussion of Related Art

Analyzing and identifying performance bottlenecks in computer systems can be difficult, requiring labor intensive data generation, expert knowledge of the application, libraries, middleware, operating system and hardware, and analytical tools.

Existing proposals for detecting central processor unit (CPU) and input/output (I/O) bottlenecks in parallel directed acyclic graph (DAG) based data flow programs assume global knowledge of data flow graph topology. Such knowledge is not always readily available.

BRIEF SUMMARY

According to an exemplary embodiment of the present disclosure, a method of detecting a bottleneck in a data flow program includes executing, by a processor, computer readable instructions constituting the data flow program, wherein the data flow program comprises a kernel, determining a percentage of time the kernel spends on a computation, and determining the kernel to be a bottleneck upon comparing the percentage of time the kernel spends on the computation to a condition.

According to an exemplary embodiment of the present disclosure, a method of detecting a bottleneck in a data flow program includes executing, by a processor, computer readable instructions constituting the data flow program, wherein the data flow program comprises a kernel, measuring an execution delay of the kernel, receiving at least one delay message from a neighboring kernel in the data flow program, and determining the kernel to be the bottleneck upon comparing the execution delay of the kernel to a delay indicated by the delay message.

According to an exemplary embodiment of the present disclosure, a method of detecting a bottleneck in a data flow program includes executing, by a processor, computer readable instructions constituting the data flow program, wherein the data flow program comprises a plurality of kernels, determining a percentage of time that each of the plurality of kernel spends on a respective computation, comparing the percentages to a condition, and determining at least one of the plurality of kernels to be a bottleneck upon determining that the condition is satisfied.

According to an exemplary embodiment of the present disclosure, a method of detecting a bottleneck in a data flow program includes executing, by a processor, computer readable instructions constituting the data flow program, wherein the data flow program comprises a plurality of kernels, measuring an execution delay of each of the plurality of kernels, and propagating a delay message in the data flow program, wherein the delay message indicates a highest execution delay of the plurality of kernels and a certain kernel of the plurality of kernels corresponding to the highest execution delay.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a bottleneck may be detected for data flow programs in an on-line context.

A bottleneck is computation task, or kernel, whose delay affects the throughput of the data flow program. The data flow program may be executing on a computer system such as a personal computer, in multi-processor type computer systems, and in the context of massively-parallel data processing on shared-nothing architecture, including cloud architecture.

It should be understood that a bottleneck may occur in other contexts and that the systems and methods described herein are not limited to the examples discussed.

The descriptions of the various embodiments of the present invention have been presented for purposes of illustration, but are not intended to be exhaustive or limiting of the present disclosure. Many modifications and variations will be apparent to those of ordinary skill in the art without departing from the scope and spirit of the present disclosure. The terminology used herein was chosen to best explain the principles of embodiments, the practical application or technical improvement over technologies found in the marketplace, or to enable others of ordinary skill in the art to understand embodiments disclosed herein.

Figure 2:
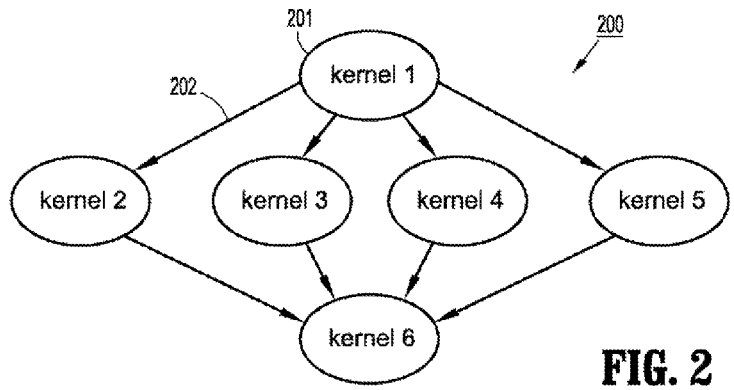
FIG. 2 is a graph about an exemplary data flow graph upon which embodiment of the present disclosure may be applied.

According to an exemplary embodiment of the present disclosure, data flow programs of interest may be modeled as a directed graph 200 as shown in FIG. 2, where a vertex, e.g., 201, represents a computing kernel and an edge, e.g., 202, represents a communication channel through which data are passed from one kernel to another.

According to an embodiment of the present disclosure, an edge (u,v) is a communication channel between two vertices. The edge is unidirectional and may be modeled as a First-In-First-Out (FIFO) queue. The interaction between kernels u and v follows a producer-consumer pattern over a fixed sized queue. A producer, u, which attempts to write to the full queue is needed to block until at least one entry in the queue becomes available. Likewise, a consumer, v, which attempts to read from the queue is required to block until at least one data item is written to the queue by producer u.

According to an embodiment of the present disclosure, one firing of a kernel may be defined as one completion of a kernel including reading of input data from the incoming queues and writing of output data to outgoing queues. For a firing of a kernel, a certain number of data tokens are needed for each incoming queue. The number of data tokens is either known prior to runtime or at the time of a firing.

According to an embodiment of the present disclosure, the execution time of a firing of a kernel may change at runtime.

Figure 4:
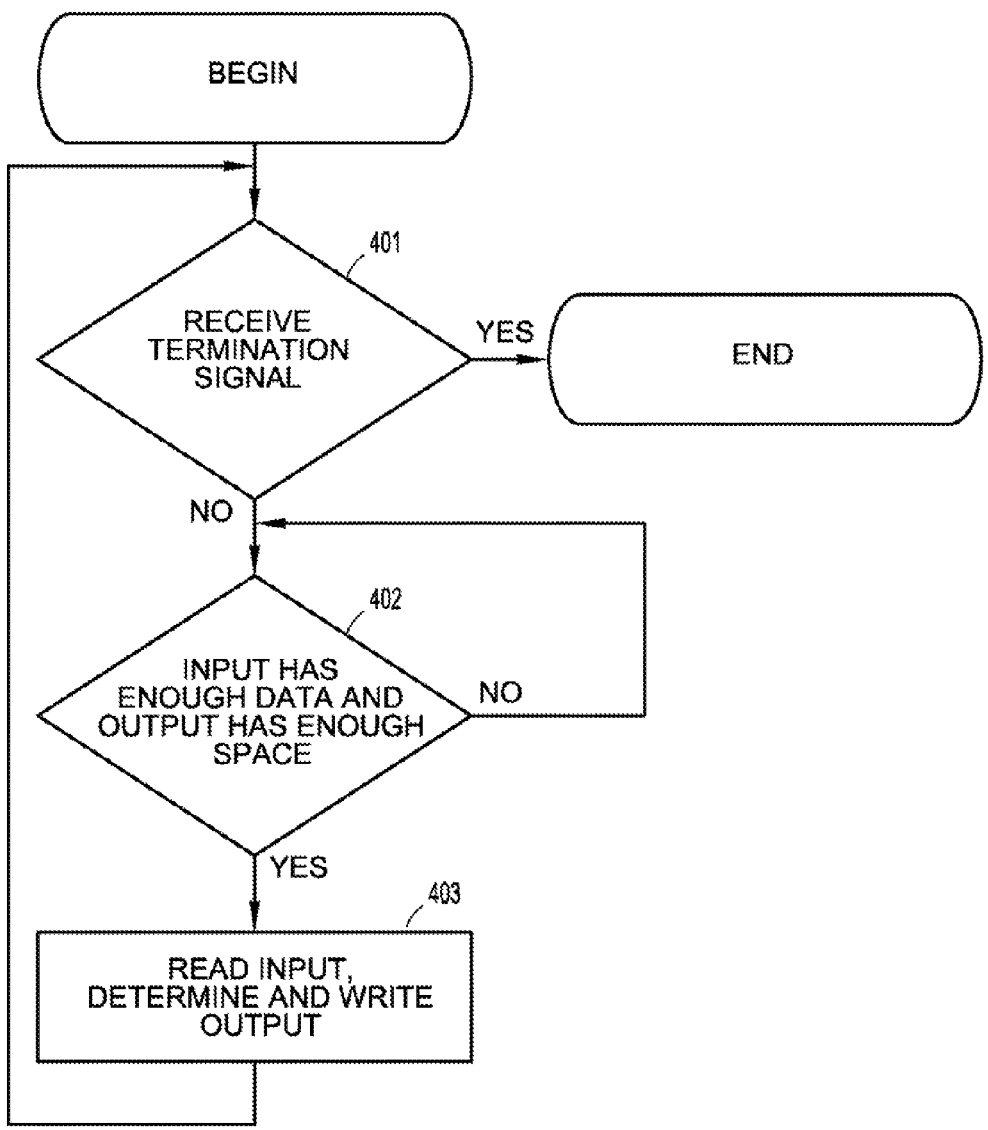
FIG. 4 is a flowchart that depicts a general execution of a kernel in a data flow graph before any exemplary bottleneck detection algorithm is applied.

A kernel in a data flow program may execute a code segment in accordance with FIG. 4. Assuming that a termination signal has not been received (401), the kernel's execution is blocked until each of its input data channels provides sufficient number of input data and each of its output data channels has enough space to accommodate the computation results (402). Once all of the input data arrives, the kernel reads the data and removes them from the input channels, executes its computation task, and writes the results to its output channels (403).

Exemplary bottleneck detection methods can identify bottlenecks in a data flow program in various cases. For example, a bottleneck may be detected when there is no central agent that has the knowledge of a complete topology of the data flow graph. Stated generally, each kernel can work individually. Further, exemplary methods may be applied when kernels are distributed across connected computing platforms. Exemplary methods may detect bottlenecks when cycles exist in the data flow program.

Various bottleneck-detection methods are applicable to data flow programs satisfying various assumptions.

Exemplary bottleneck-detection methods may be used on the data flow program with blocking execution semantics. Blocking execution semantics block a kernel's execution according to input/output availability of the kernel. More specifically, a kernel is required to wait for input data to consume; also, a kernel is required to wait for an available storage space for its output; the kernel executes only if input data are available and space for the storing output is sufficient. Otherwise, the kernel waits until those conditions are satisfied. In the present disclosure, an action of the kernel is a computation of the kernel excluding waiting for input data and outputting data to storage.

Figure 1A:
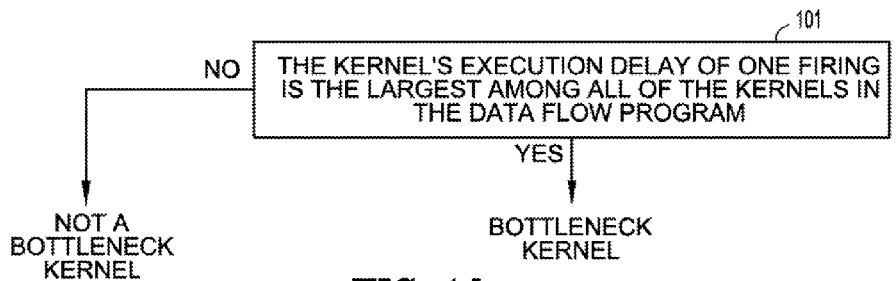
FIGS. 1A-C show flow diagrams illustrating exemplary conditions according to embodiments of the present disclosure.
Figure 1B:
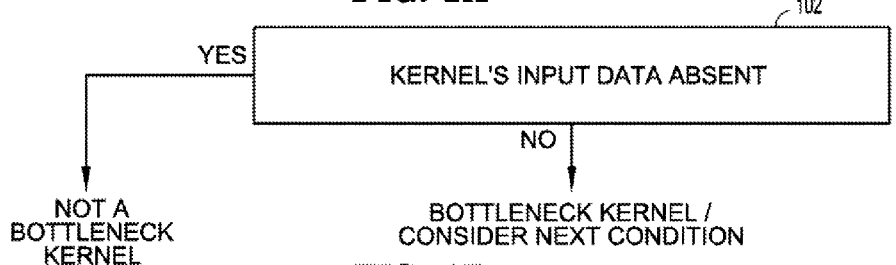
Figure 1C:
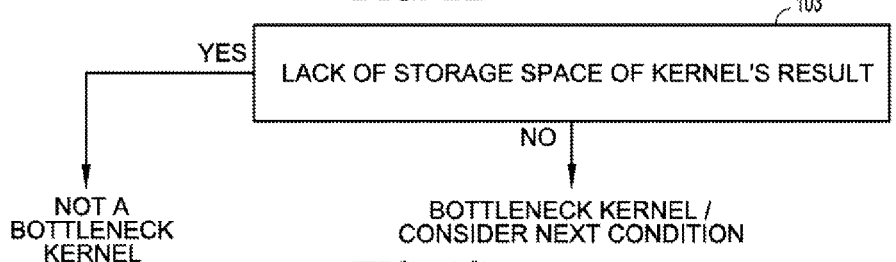

Assuming the above blocking execution semantics, a bottleneck-detection method may use one or more conditions to determine whether a kernel is a bottleneck. Exemplary conditions are shown FIG. 1A-C. Block 101 of FIG. 1A shows a delay time comparison, wherein the bottleneck kernel's execution delay of one firing is the largest among all of the kernels in the data flow program. Block 102 of FIG. 1B shows that the bottleneck kernel's execution may not be blocked due to the absence of its input data. Block 103 of FIG. 1C shows that the bottleneck kernel's execution may not be blocked due to the absence of storage space for storing a result.

Bottleneck-detection methods may be executed by each kernel in a data flow program. Further, each exemplary bottleneck-detection method individually measures the execution delay of its host kernel or individually identifies a condition(s) on its input/output queues. In one data flow program all kernels use the same bottleneck-detection method; different exemplary bottleneck-detection methods may not be mixed in the same data flow program.

Communicating Bottleneck Detection: Two exemplary bottleneck-detection methods are described based on execution delay as shown in block 101 of FIG. 1A, and in each of these two methods the information on kernel delays may be communicated among kernels. These exemplary bottleneck-detection methods may be called communicating bottleneck-detection methods.

Figure 5:
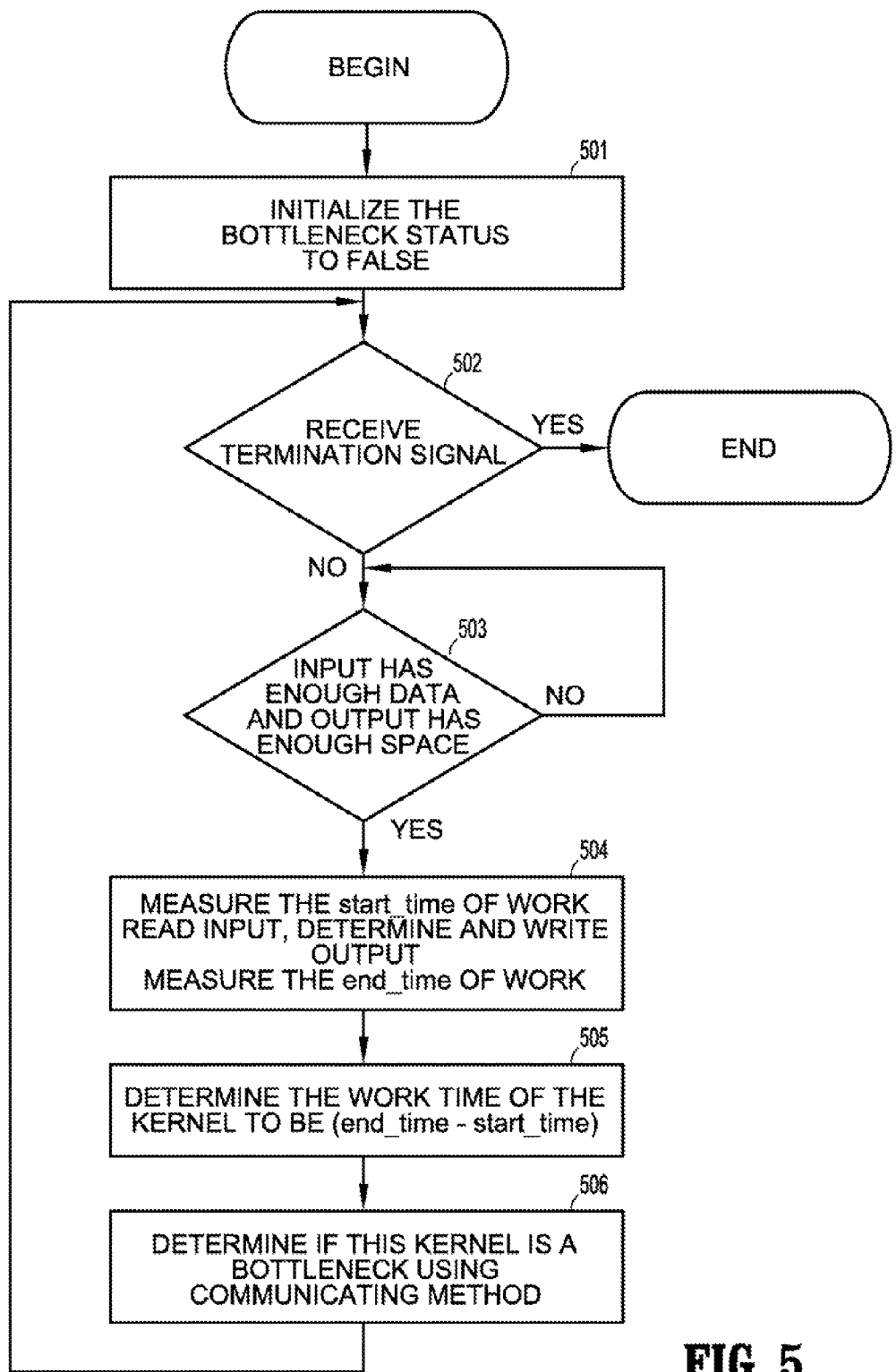
FIG. 5 is a flowchart that depicts an execution of a kernel when the first exemplary communicating bottleneck detection is applied.
Figure 6:
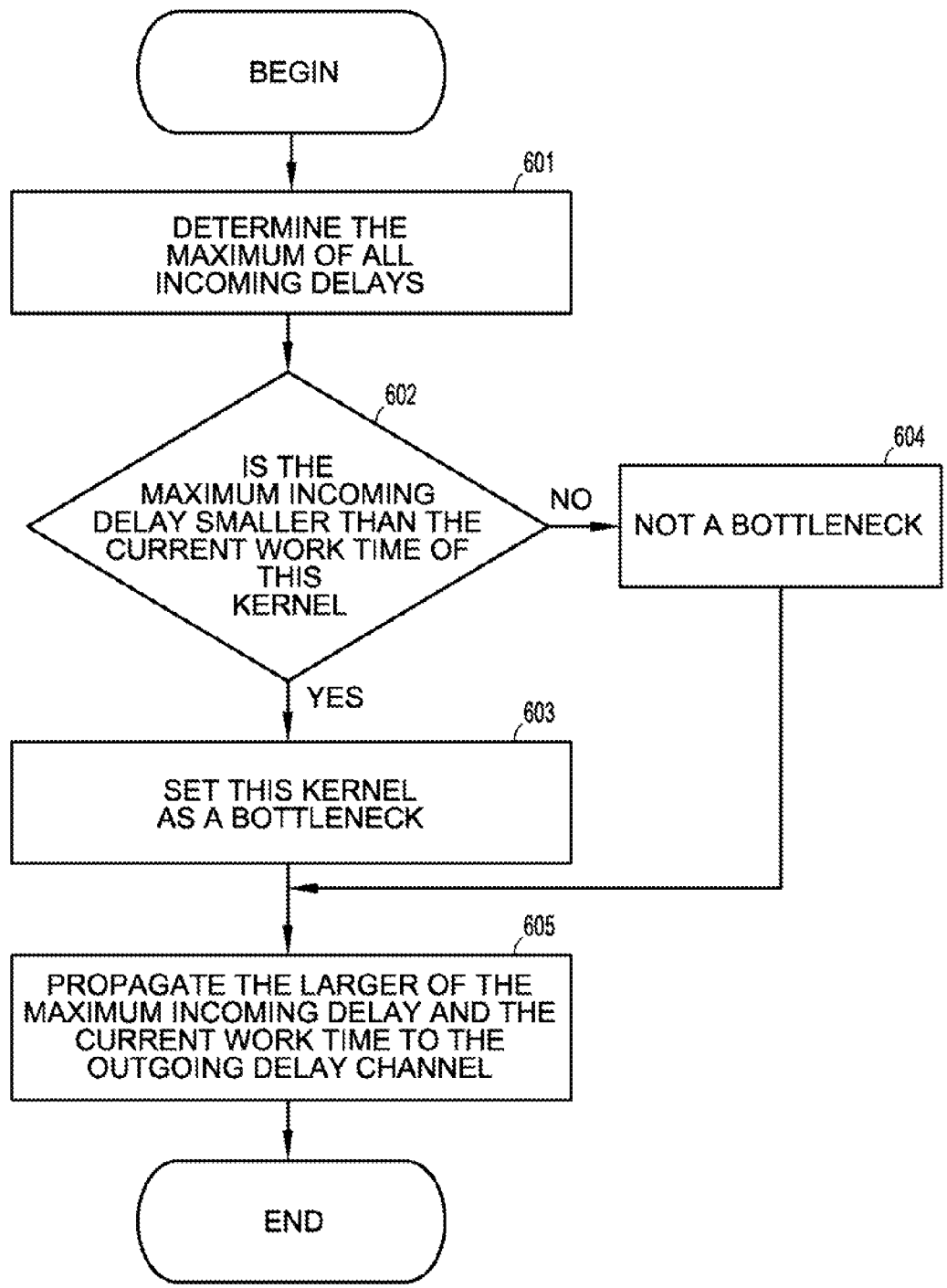
FIG. 6 is a flowchart that depicts the details of the first exemplary communicating bottleneck detection method within a kernel.
Figure 8A:
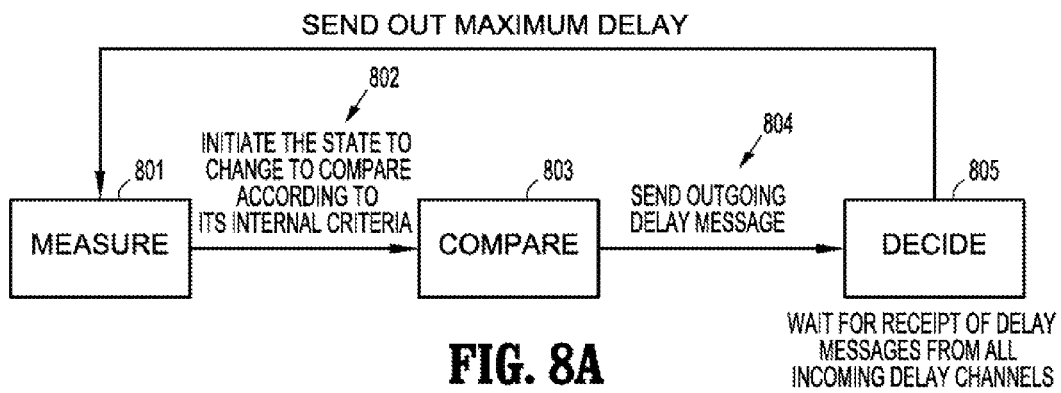
FIGS. 8A-B are state transition diagrams for describing the processes of an initiating kernel and all other kernels in the second exemplary communicating bottleneck detection method.
Figure 8B:
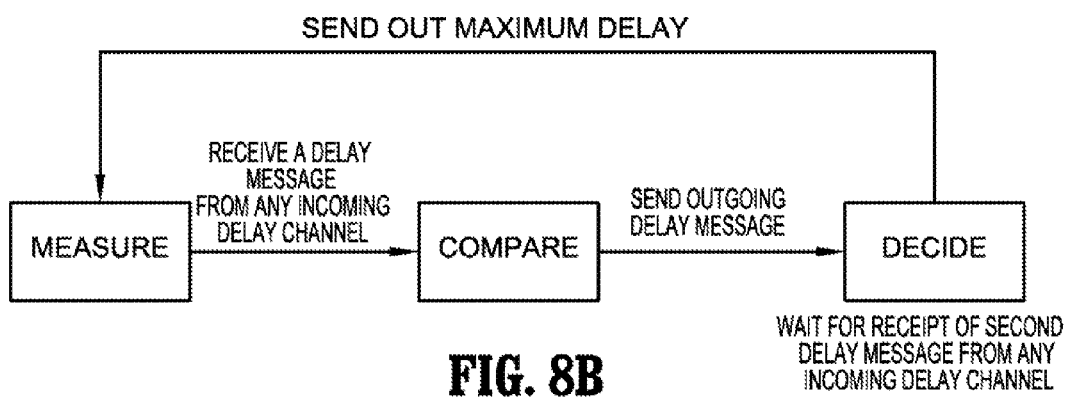

A first exemplary implementation of a communicating bottleneck-detection method is detailed in FIGS. 5 and 6, while the state transition diagrams for a second implementation are given in FIGS. 8A-B. For communicating bottleneck-detection methods, no central agent is needed to determine a largest among all kernels' delays. It may be sufficient for each kernel to be aware of only its immediate upstream and downstream kernels, i.e., the immediate neighboring nodes in the graph. For a sink kernel such as kernel 6 in FIG. 2, if any, it is required to know the source kernel, for example, kernel 1. A source kernel of a dataflow program is a kernel that has no upstream kernels but only downstream kernels as its neighboring nodes. A dataflow program may have one or more source kernel. In case of the existence of a plurality of source kernels, a pseudo source kernel may be introduced in the context of directed acyclic graph. The pseudo source kernel may have all the source kernels as downstream neighbors. A kernel running an exemplary bottleneck-detection method may select a largest delay observed so far, including delay measurements received from its upstream neighbor(s) and of its own delay, and outputs the largest delay observed by the kernel to its downstream receiver(s). It should be understood that the condition may be variously configured (e.g., largest, 2 largest delays, delays greater than a threshold, etc.).

It should be understood a data flow program may include one or more kernels. Herein the terms "node" and "kernel" may be used to refer to software components, while "processing node" may be used to indicate a component implemented in hardware.

Construction of Delay Channels: The communicating methods use at least one channel between kernels for communicating delay messages in addition to a data communication channel. These additional channels are delay channels.

The construction of the delay channels is orthogonal to the communicating bottleneck-detection method and can be constructed off-line. Off-line methods for constructing the delay channels may be based on the topology of a given data flow graph.

Figure 3A:
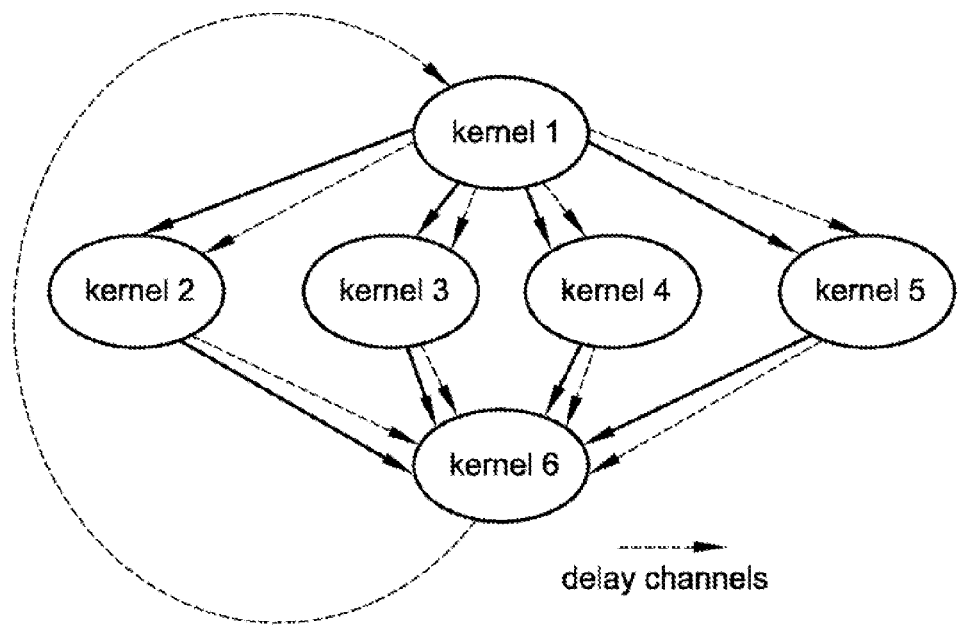
FIGS. 3A-B are graphs according to an embodiment of the present disclosure; and show two exemplary delay channels that can be used in exemplary communicating bottleneck detection methods.

According to the first example in FIG. 3A, the first method for constructing delay channels may be applied to acyclic data flow graphs. Since the given data flow graph is an acyclic data flow graph, it may be assumed that there is a single source kernel s and a sink kernel t. The construction of the delay channels closely follows the data channels in the flow graph. For each data channel (i, j), a parallel delay channel from kernel i to j is added. In addition a delay channel may be added connecting the sink kernel t to the source kernel s.

Figure 3B:
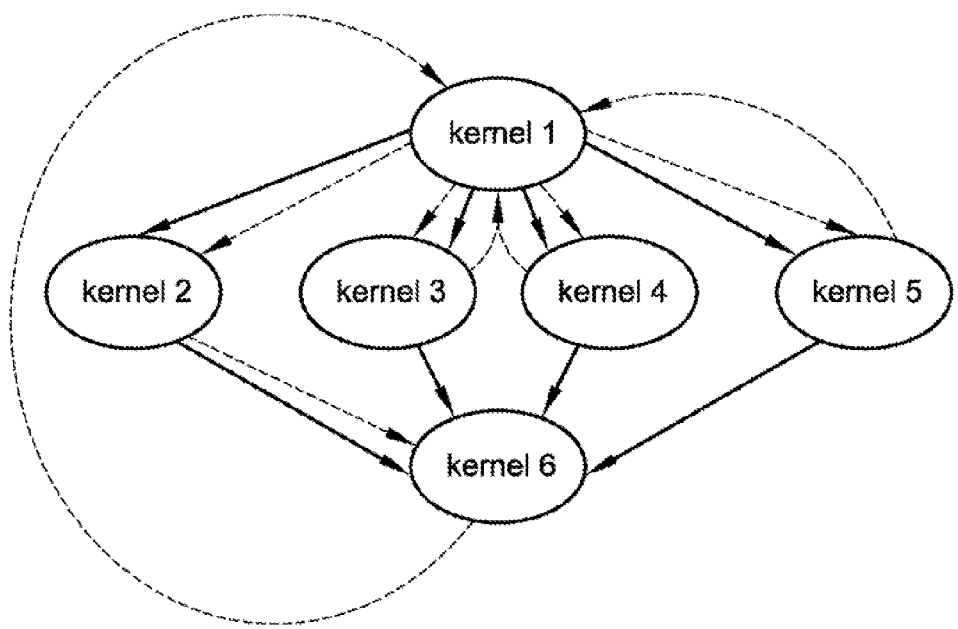

The second exemplary method for augmenting a data flow program applies to both cyclic and acyclic data flow graphs and is shown in FIG. 3B. To construct the delay channels for a data flow graph G={V,E}, G's spanning tree T={V,B} is determined. Notice that the set of tree edges B is a subset of the graph edges E. Without loss of generality, assume that T has one root vertex r and a non-empty set of leaf vertices L $\subseteq$ V. For each tree edge (i, j)$\in$B, a delay channel is built from kernel i to j. Further, for each leaf kernel l, a delay channel (l,r) is built connecting l to the root kernel r. Notice that a channel from the leaf to the root does not correspond to any tree edge in B, and may not have a corresponding edge in E either.

Delay channels constructed by any of the exemplary methods, can be used by any communicating bottleneck-detection method.

First Exemplary Communicating Method: For the communicating bottleneck-detection type methods, each kernel in a data flow program performs its main computation and a bottleneck-detection method. FIG. 5 shows a general structure of the kernel code in which the exemplary communicating bottleneck detection method is adopted. Each kernel is augmented with additional input and output delay channels. The kernel measures the elapsed execution time of the work time in FIG. 5.

More particularly, a bottleneck status is initialized to false (501). The kernel's execution is blocked until each of its input data channels provides sufficient input data and each of its output data channels has enough space to accommodate the computation results (503). A start time and an end time are measured or determined (504) and the work time of the kernel is determined as the end time minus the start time (505). A kernel is determined to be a bottleneck at block 506 (for example, see FIG. 1A). A kernel's execution repeats until receipt of a termination signal at block 502.

At block 506, a kernel's bottleneck detection method may use its measured work time and incoming delay messages to decide whether the kernel is a bottleneck. The outgoing delay message is calculated in the bottleneck detection method and sent to the outgoing delay channels. A delay message is short and simple. Its exact format may depend on the bottleneck-detection algorithm. An exemplary bottleneck detection method may attempt to update the maximum effective delay of the data flow program as shown in FIG. 6.

In FIG. 6, the maximum of the incoming delays is determined (601). The current measured work time of the kernel may be normalized by the number of firings of the kernel. If the maximum incoming delay is sufficiently smaller then the normalized current work time (602) the kernel is determined to be a bottleneck (603). Otherwise the kernel is determined not to be a bottleneck (604). In the case of a bottleneck (603), the larger of the maximum delay and the current work time is set to an outgoing delay channel (605).

Various methods can be used to compare the quantities of delays. For example, in one comparison, a method may determine if the maximum incoming delay (num1) is sufficiently smaller than the current measured work time (num2) (602). In this case the following formula may be used:

diff=num2−num1;

return(diff≥num2*DIFF THRESHOLD)?true:false

Second Exemplary Communicating Method: The second exemplary communicating bottleneck detection method adopts more explicit state transitions. More specifically, kernels repeatedly iterate through multiple states, e.g., three states measure, compare, and decide, while the data flow program is running. The transition from one state to another is triggered by incoming and outgoing delay messages. It may be assumed there is only one source kernel s in the data flow program.

In the first state measure a kernel measures the delay of each firing of its main computation task, but does not communicate. The delay measurements can be averaged across multiple firings. The source kernel initiates the transition from state measure to the second state compare. The state transition at the source kernel may be triggered by certain predetermined criteria, e.g., if the measured system throughput degrades significantly.

An example three-state diagram for a source node is shown in FIG. 8A. Block 801 and the condition 802 show the first measuring state and the condition for initiating the state to change to second state compare (803). Counterparts for a non-source kernel are shown in FIG. 8B.

In the second state compare (803 in FIG. 8A) the source kernel sends out its own measured delay to each of the downstream receivers of the kernel's output delay channels. After receiving a delay message from any of its input delay channels, a non-source kernel enters state compare. In state compare the kernel then compares the delay it has received so far with its own measured delay, and saves the maximum (809 in FIG. 8B). After the kernel receives one delay message from each of its input delay channels, it sends out the maximum delay to the downstream receivers of its output delay channels (810 in FIG. 8B).

After sending out the maximum delay message a kernel enters state decide (805 in FIG. 8A and 811 in FIG. 8B). In this state the source kernel waits in non-blocking fashion until all of its upstream neighbors have sent in one delay message with a delay measurement. It then selects the maximum delay among all the received delay measurements. If the maximum delay equals its own delay, it declares itself as a bottleneck. This maximum delay is then sent to each of its output delay channels, and the source kernel returns to state measure. Each of the non-source kernels, after receiving a second delay message, compares the delay measurement in the delay message with its own delay. If the received delay is the same as the kernel's own measured delay, the kernel declares itself as a bottleneck. The kernel also forwards the received delay to each of its output delay channels. After receiving delay from each of its input channels, a kernel returns to state measure.

Figure 7:
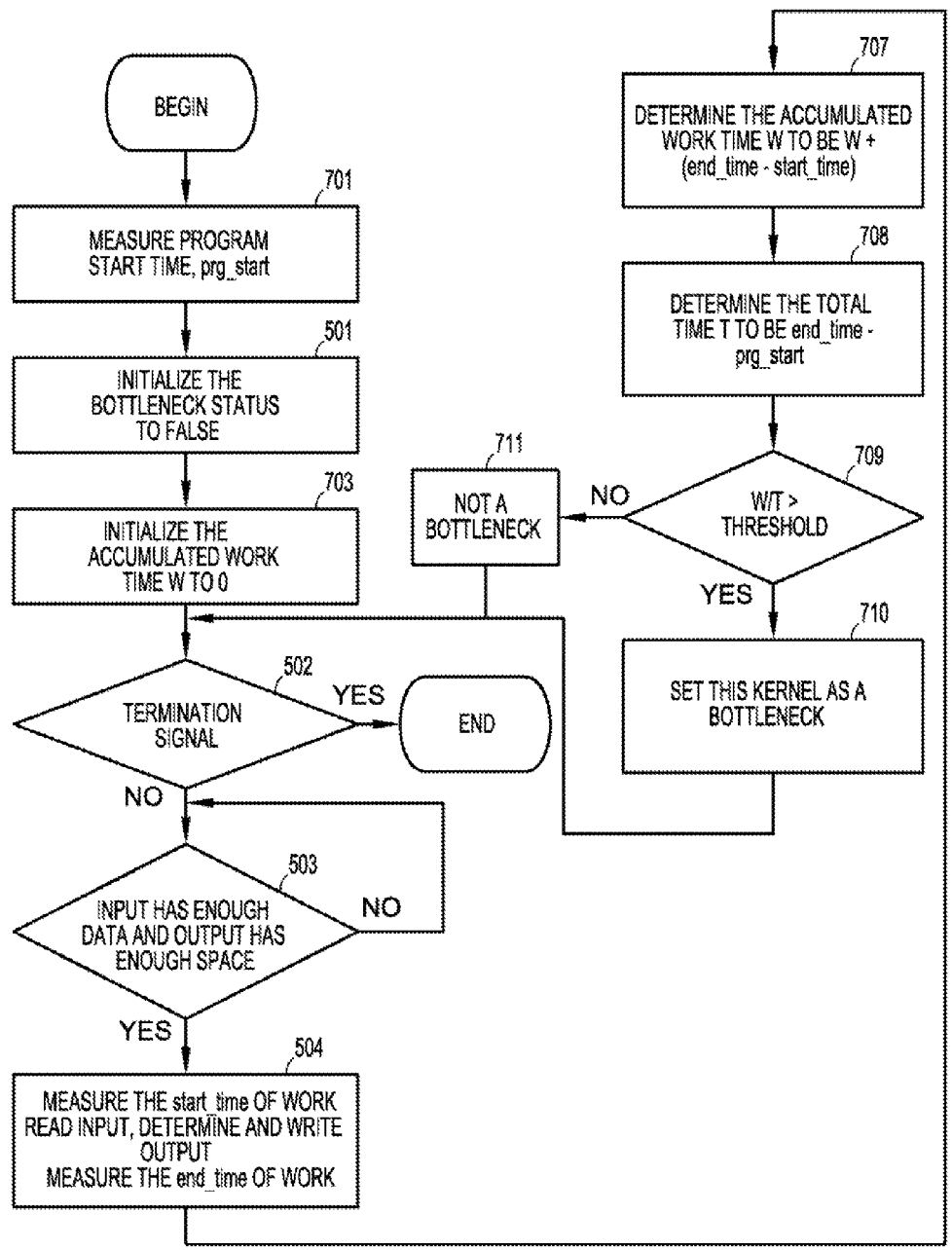
FIG. 7 is a flowchart that depicts an execution of a kernel with an exemplary local bottleneck detection method.

Local (Non-Communicating) Exemplary Bottleneck Detection: According to an embodiment of the present disclosure, a local bottleneck-detection method determines whether a kernel is a bottleneck according to how much time the kernel spends on computation as compared to the amount time when the kernel is blocked. Unlike communicating bottleneck-detection methods, the local bottleneck-detection method does not require an additional delay message or delay channel. FIG. 7 is a flow diagram of exemplary kernel code for a local bottleneck-detection method.

Accessing the ratio of time when a kernel spends on computation to the time when the kernel is blocked is used as an exemplary method for determining a bottleneck based on the conditions shown in FIGS. 1B and 1C.

Referring to FIG. 7, a program start time is determined (701) and a bottleneck status is initialized to false (501). An accumulated work time W is initialized to zero (703). Blocks 502, 503 and 504 are discussed above with reference to FIG. 5. Suppose an elapsed runtime of the program at the end of an iteration is T (708), while the kernel spends W time (707) doing useful work and (T−W) time being blocked. A bottleneck-detection method determines the ratio R=W/T (709). If R is greater than a predetermined threshold (709), e.g., 0.95, the kernel is declared as a bottleneck (710) and not otherwise (711).

As described above, exemplary bottleneck detection algorithms may be described as communicating and local methods. Each method may be executed by each kernel. The communicating methods use extra delay communicating channels. In contrast, the local method does not need delay channels and may only measure the performance of its host kernel.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 9:
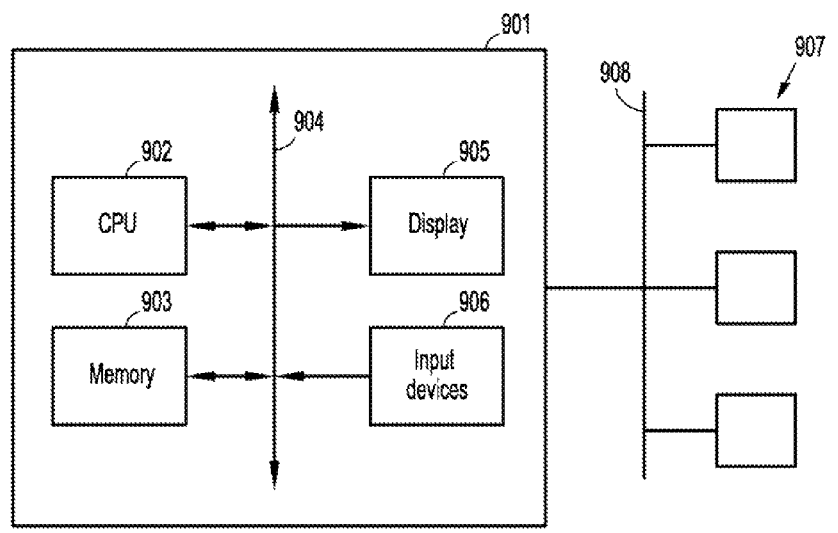
FIG. 9 is an exemplary system for execution a method according to an embodiment of the present disclosure.

For example, FIG. 9 is a block diagram depicting an exemplary system for bottleneck detection. The system 901 may include a processor 902, memory 903 coupled to the processor (e.g., via a bus 904 or alternative connection means), as well as input/output (I/O) circuitry 905-906 operative to interface with the processor 902. The processor 902 may be configured to perform one or more methodologies described in the present disclosure, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

Both for a local bottleneck detection method and a communication bottleneck detection method a multi-core processor or multi-processor system may be used in a single system 901, where each of the cores in a multi-core processor or each of the processor in the multi-processor system may be a processing node. Kernels in a dataflow program are run on multiple cores and/or processing devices in the single system. At the same time, both methods may be used in a distributed system where at least one additional system 907 is connected with the system 901 via a network 908. Kernels in a dataflow program may be run on multiple cores and/or processing devices in each single system within the distributed system.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method of detecting a bottleneck in a data flow program, the method comprising:
   executing, by a processor, computer readable instructions constituting the data flow program, wherein the data flow program comprises a kernel;
   identifying that a condition is present on an input/output queue of the kernel, wherein a condition on the input queue of the kernel is a state in which the kernel's execution is blocked by a waiting for data to consume and a condition on the output queue of the kernel is a state in which the kernel's execution is blocked by a waiting for available space to store an output of the kernel;
   determining a time spent waiting for satisfaction of the identified condition on the input/output queue;
   determining a percentage of time the kernel spends on a computation; and
   determining the kernel to be a bottleneck upon comparing the percentage of time the kernel spends on the computation to the time spent waiting for satisfaction of the identified condition.

2. The method of claim 1, wherein determining the percentage of time the kernel spends on the computation comprises:
   determining a work time of the kernel as an accumulation of time spent by a processing node performing the computation of the kernel;
   determining a total time of the kernel as a total runtime of the dataflow program until a time of a measurement within the kernel; and
   determining the percentage of time the kernel spends on the computation by dividing the work time by the total time.

3. The method of claim 2, wherein the work time excludes a time waiting for input data and a time outputting data to storage.

4. The method of claim 2, wherein the point of the measurement is a known set of instructions of the kernel.

5. The method of claim 1, wherein the kernel is blocked due to lack of input data.

6. The method of claim 1, wherein the kernel is blocked due to lack of space for a result of the computation.

7. The method of claim 1, wherein comparing the percentage of time the kernel spends includes calculating a ratio of the time the kernel spends on the computation compared to the time the kernel spends waiting for satisfaction of the identified condition and determining whether the calculated ratio meets or exceeds a predetermined threshold.

8. The method of claim 1, further comprising a computer program product for detecting the bottleneck in the data flow program, the computer program product comprising a non-transitory computer readable storage medium having computer readable program code embodied therewith for performing the method of claim 1.

9. A method of detecting a bottleneck in a data flow program, the method comprising:
   executing, by a processor, non-transitory computer readable instructions constituting the data flow program, wherein the data flow program comprises a first kernel; measuring an execution delay of the first kernel; receiving at least one delay message from an immediate upstream or immediate downstream kernel, the immediate upstream or immediate downstream kernel being a kernel whose node on a graph of the data flow program is directly connected to a node of the first kernel, either immediately before or immediately after the first kernel; and
   determining the first kernel to be the bottleneck upon comparing the execution delay of the first kernel to a delay indicated by the delay message,
   wherein the first kernel is only aware of its immediate upstream and immediate downstream kernels which are immediate neighboring nodes on the graph.

10. The method of claim 9, wherein each kernel of the data flow program is associated with a respective data flow node, and each kernel propagates a maximum delay in a respective delay message, wherein the maximum delay is determined from among the execution delay of the first kernel and the delay indicated by the delay message from the immediately upstream or immediately downstream kernel.

11. The method of claim 9, wherein measuring the execution delay of the first kernel comprises:
   determining a start time of the first kernel;
   determining an end time of the first kernel; and
   determining a difference between the end time and the start time.

12. The method of claim 9, further comprising initiating a propagation of delay messages for a bottleneck detection.

13. The method of claim 9, further comprising a computer program product for detecting the bottleneck in the data flow program, the computer program product comprising a non-transitory computer readable storage medium having computer readable program code embodied therewith for performing the method of claim 9.

14. A method of detecting a bottleneck in a data flow program, the method comprising:
   executing, by a processor, non-transitory computer readable instructions constituting the data flow program, wherein the data flow program comprises a plurality of kernels;
   identifying that a condition is present on an input/output queue of each of the plurality of kernels, wherein a condition on the input queue of the kernel is a state in which the kernel's execution is blocked by a waiting for data to consume and a condition on the output queue of the kernel is a state in which the kernel's execution is blocked by a waiting for available space to store an output of the kernel;
   determining a percentage of time that each of the plurality of kernel spends on a respective computation relative to a time that each of the plurality of the plurality of kernels spends waiting for satisfaction of each of the identified conditions; and
   determining at least one of the plurality of kernels to be a bottleneck upon determining that the determined percentage of time exceeds a predetermined threshold.

15. The method of claim 14, wherein determining the percentage of time the each of the plurality of kernel spends on a respective computation comprises:
   determining a work time of each kernel as an accumulation of time spent by a processing node perform the computation of each kernel;
   determining a total time of each kernel as a total runtime of the dataflow program until a time of a measurement with the respective kernel; and
   determining the percentage of time each kernel spends on the computation by dividing the work time by the total time of each respective kernel.

16. The method of claim 15, wherein the point of the measurement is a known set of instructions of the respective kernel.

17. The method of claim 14, wherein the kernel is blocked due to at least one of a lack of input data and a lack of space for a result of the computation.

18. The method of claim 14, further comprising a computer program product for detecting the bottleneck in the data flow program, the computer program product comprising a non-transitory computer readable storage medium having computer readable program code embodied therewith for performing the method of claim 14.

19. A method of detecting a bottleneck in a data flow program, the method comprising:
- executing, by a processor, non-transitory computer readable instructions constituting the data flow program, wherein the data flow program comprises a plurality of kernels;
- measuring an execution delay of each of the plurality of kernels; and propagating a delay message in the data flow program,
- wherein the delay message indicates a highest execution delay of the plurality of kernels and a certain kernel of the plurality of kernels corresponding to the highest execution delay, and
- wherein propagating the delay message includes passing along a delay message from an immediate upstream kernel of the plurality of kernels to an immediate downstream kernel of the plurality of kernels, the immediate upstream kernel being a kernel whose node on a graph of the data flow program is directly connected to a node immediately before a node on the graph representing the immediately downstream kernel,
- wherein each kernel is only aware of its immediate upstream and immediate downstream kernels which are immediate neighboring nodes on the graph.

20. The method of claim 19, wherein each kernel of the data flow program is associated with a respective data flow node, and each kernel propagates a maximum delay in the delay message, wherein the maximum delay is determined from among respective execution delays of the kernel and the delay message received from a neighboring kernel.

21. The method of claim 19, wherein measuring the execution delay of the kernel comprises:
- determining a start time of the kernel;
- determining an end time of the kernel; and
- determining a difference between the end time and the start time.

* * * * *